US007937069B2

(12) United States Patent
Rassam

(10) Patent No.: US 7,937,069 B2
(45) Date of Patent: May 3, 2011

(54) SYSTEM AND PROCESS FOR SWITCHING BETWEEN CELL PHONE AND LANDLINE SERVICES

(76) Inventor: Frederic Rassam, New York, NY (US)

( * ) Notice: Subject to any disclaimer, the term of this patent is extended or adjusted under 35 U.S.C. 154(b) by 392 days.

(21) Appl. No.: 11/380,898

(22) Filed: Apr. 28, 2006

(65) Prior Publication Data
US 2007/0037550 A1    Feb. 15, 2007

Related U.S. Application Data

(60) Provisional application No. 60/676,632, filed on Apr. 29, 2005.

(51) Int. Cl.
*H04M 11/00* (2006.01)
(52) U.S. Cl. ......... 455/406; 455/405; 455/418; 455/424
(58) Field of Classification Search ........... 455/406, 455/405, 418, 424
See application file for complete search history.

(56) References Cited

U.S. PATENT DOCUMENTS

| | | | |
|---|---|---|---|
| 5,138,650 A | 8/1992 | Stahl et al. | |
| 5,638,433 A | 6/1997 | Bubien, Jr. et al. | |
| 5,987,325 A | 11/1999 | Tayloe | |
| 6,058,312 A * | 5/2000 | Kimura | 455/445 |
| 6,078,652 A | 6/2000 | Barak | |
| 6,240,169 B1 | 5/2001 | Haskins et al. | |
| 6,424,706 B1 | 7/2002 | Katz et al. | |
| 6,473,499 B1 | 10/2002 | Ng et al. | |
| 6,487,283 B2 | 11/2002 | Thomas et al. | |
| 6,498,938 B1 | 12/2002 | Morrow, Sr. | |
| 6,539,237 B1 | 3/2003 | Sayers et al. | |
| 6,741,835 B2 | 5/2004 | Pulver | |
| 6,751,462 B1 | 6/2004 | Torrey et al. | |
| 6,795,686 B2 | 9/2004 | Master | |
| 6,804,532 B1 | 10/2004 | Moon et al. | |
| 6,804,536 B1 | 10/2004 | Bultman | |
| 6,813,264 B2 | 11/2004 | Vassilovski | |
| 6,836,644 B2 | 12/2004 | Bacon et al. | |
| 6,954,643 B2 | 10/2005 | Petrus | |
| 6,970,474 B1 | 11/2005 | Sinha | |
| 6,970,692 B2 | 11/2005 | Tysor | |
| 7,003,281 B1 | 2/2006 | Gamble | |

(Continued)

OTHER PUBLICATIONS

Senior Design Project Final Report Intelligent Cellular Telephone Docking Station; Fred Rassam, David Plum, Subhakam Misra; Daniel Svoboda, Advisor Bruce McNair Published May 15, 2004.

(Continued)

*Primary Examiner* — Nghi H Ly
(74) *Attorney, Agent, or Firm* — Collard & Roe, P.C.

(57) ABSTRACT

A system and a method for determining which type of telephone communication service to use. The system can include at least one base station, and at least one telephone communication system in communication with the base station. There can also be at least one computer which is in communication with at least one of the base station or the telephone communication system. There can also be at least one database system in communication with the computer. The database system can be for storing data for assisting the computer in selecting a particular telecommunication service to place a telephone call based upon a user's preferences. The database system can include a matrix which sets the price of the telephone call vs. the signal or reception quality of the call so that the computer or system will select the most desired calling plan based upon a user's criteria or preferences.

21 Claims, 8 Drawing Sheets

U.S. PATENT DOCUMENTS

| | | | | |
|---|---|---|---|---|
| 7,010,107 | B1* | 3/2006 | Lee et al. | 379/202.01 |
| 7,016,673 | B2 | 3/2006 | Reddy et al. | |
| 7,197,321 | B2* | 3/2007 | Erskine et al. | 455/456.1 |
| 7,443,971 | B2* | 10/2008 | Bear et al. | 379/210.01 |
| 2002/0065076 | A1 | 5/2002 | Monroe | |
| 2004/0023652 | A1 | 2/2004 | Shah et al. | |
| 2004/0204033 | A1 | 10/2004 | Yang | |
| 2004/0235518 | A1 | 11/2004 | Beyette et al. | |
| 2004/0242230 | A1 | 12/2004 | Rue | |
| 2004/0259541 | A1 | 12/2004 | Hicks, III et al. | |
| 2004/0266478 | A1 | 12/2004 | King et al. | |
| 2005/0009525 | A1 | 1/2005 | Evslin | |
| 2005/0090283 | A1 | 4/2005 | Rodruquez | |
| 2005/0101347 | A1 | 5/2005 | Shroeder | |
| 2005/0107086 | A1 | 5/2005 | Tell et al. | |
| 2005/0153736 | A1 | 7/2005 | Ganton | |
| 2005/0233749 | A1 | 10/2005 | Karaoguz et al. | |
| 2006/0068795 | A1 | 3/2006 | Caspi et al. | |

OTHER PUBLICATIONS

Senior Design Project—Spring Semester Interim Report Group #20 Intelligent Cellular Telephone Docking Station; Dan Svoboda; Fred Rassam; Subhakam Misra; David Plum Published Mar. 22, 2004.

Senior Design Project Final Design Report Intelligent Cellular Telephone Docking Station; Fred Rassam, David Plum, Subhakam Misra; Daniel Svoboda, Advisor Bruce McNair Published Dec. 11, 2003.

Senior Design Project Interim Report Group # 20 Intelligent Cellular Docking Station Fred Rassam, David Plum, Subhakam Misra; Daniel Svoboda, Advisor Bruce McNair Published Oct. 14, 2003.

Report Series 1 for Intelligent Cellular Telephone Docking Station; Group Leader Fred Rassam dated Sep. 21, 2003.

Report #2 for Intelligent Cellular Telephone Docking Station Group Leader Fred Rassam Dated Sep. 28, 2003.

Report #3 for intelligent Cellular Telephone Docking Station; Group Leader Fred Rassam Dated Oct. 3, 2003.

Report # 4 for Intelligent Cellular Telephone Docking Station, Group Leader Fred Rassam Dated Oct. 14, 2003.

Report $5 for Intelligent Cellular Telephone Docking Station; Group Leader Fred Rassam Dated Oct. 20, 2003.

Report #6 for Intelligent Cellular Telephone Docking Station Group Leader Fred Rassam, Dated Oct. 27, 2003.

Report #7 for Intelligent Cellular Telephone Docking Station Group Leader Fred Rassam, Dated Nov. 3, 2003.

Report #8 for Intelligent Cellular Telephone Docking Station;Group Leader, Fred Rassam, Dated Nov. 10, 2003.

Report #9 for Intelligent Cellular Telephone Docking Station,Group Leader Fred Rassam Dated Nov. 17, 2003.

Report #10 for Intelligent Cellular Telephone Docking Station Group Leader, Fred Rassam, Dated Nov. 24, 2003.

Report #11 for Intelligent Cellular Telephone Docking Station Group Leader, Fred Rassam Dated Dec. 2, 2003.

Report # 12 for Intelligent Cellular Telephone Docking Station Group Leader Fred Rassam Dated Dec. 11, 2003.

Report #1 for Intelligent Cellular Telephone Docking Station; Group Leader David Plum Dated Jan. 26, 2004.

Report #2 for Intelligent Cellular Telephone Docking Station; Group Leader David Plum Dated Jan. 31, 2004.

Report #3 for Intelligent Cellular Telephone Docking Station; Group Leader David Plum Dated Feb. 6, 2004.

Report#4 for Intelligent Cellular Telephone Docking Station; Group Leader Daniel Svoboda Dated Feb. 16, 2003.

Report #5 Intelligent Cellular Telephone Docking Station Group Leader Daniel Svoboda Dated Feb. 23, 2004.

Report #6 Intelligent Cellular Telephone Docking Station Daniel Svoboda Dated Mar. 1, 2004.

Report #7 Intelligent Cellular Telephone Docking Station Group Leader Daniel Svoboda Dated Mar. 8, 2004.

Report #8 Intelligent Cellular Telephone Docking Station Group Leader Daniel Svoboda Dated Mar. 21, 2004.

Report #9 Intelligent Cellular Telephone Docking Station Group Leader Daniel Svoboda Dated Mar. 28, 2004.

Report #10 Intelligent Cellular Telephone Docking Station Group Leader Daniel Svoboda Dated Apr. 5, 2004.

Report #11 Intelligent Cellular Telephone Docking Station Group Leader Daniel Svoboda Dated Apr. 12, 2004.

Report #12 Intelligent Cellular Telephone Docking Station Group Leader Daniel Svoboda Dated Apr. 19, 2004.

* cited by examiner

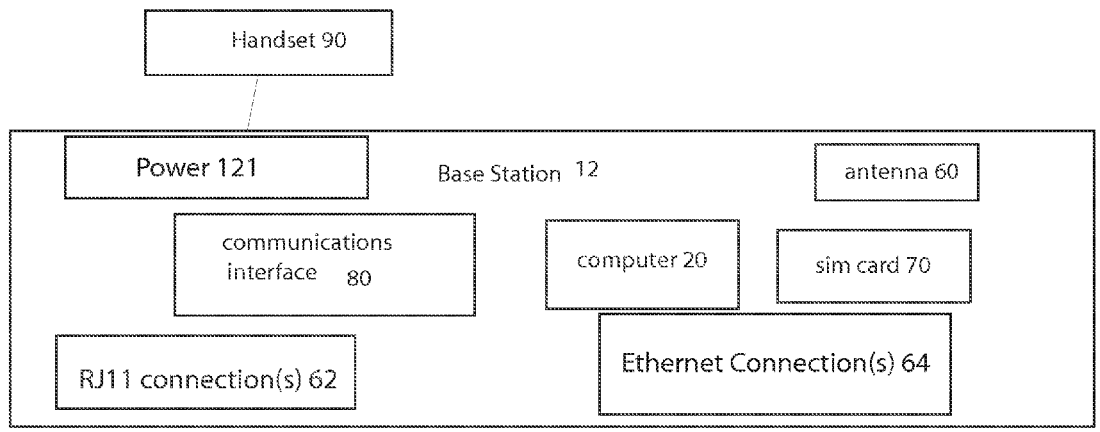
FIG. 3A
FIG. 3B
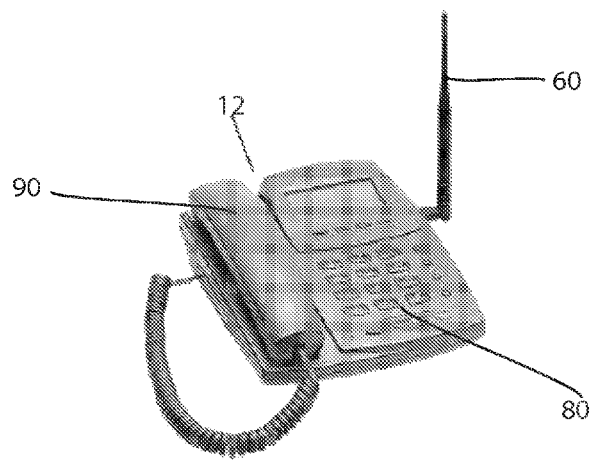

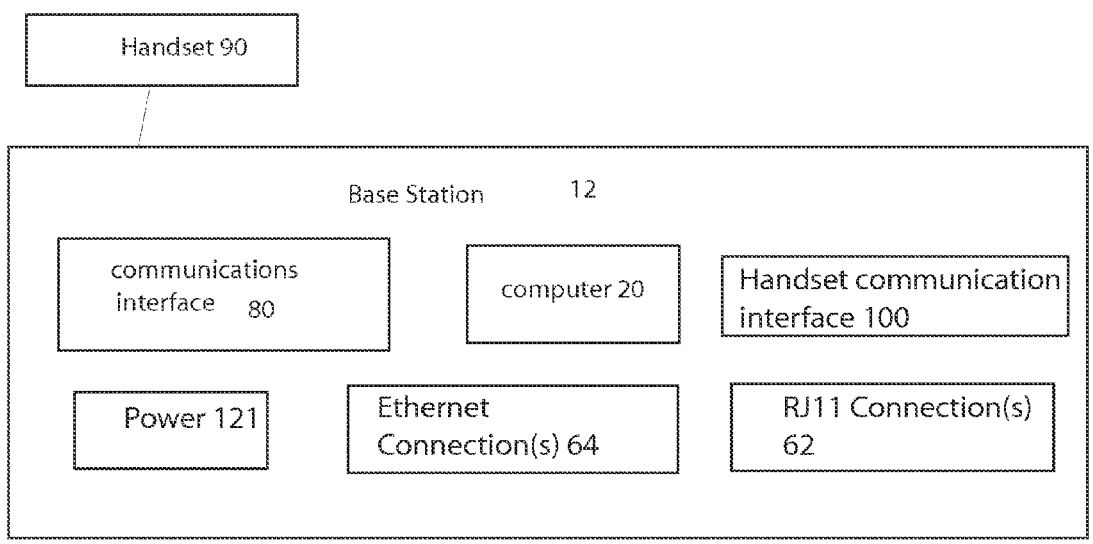
FIG. 3C
FIG. 3D
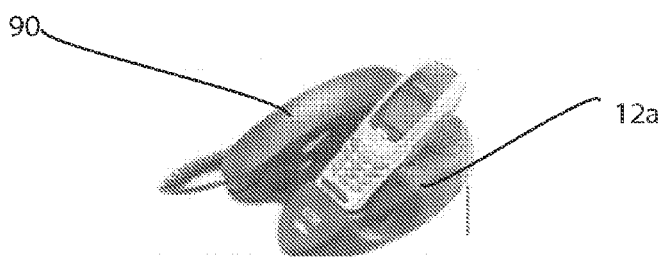
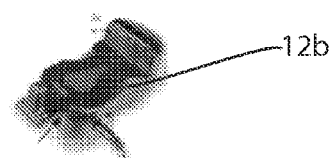
FIG. 3E

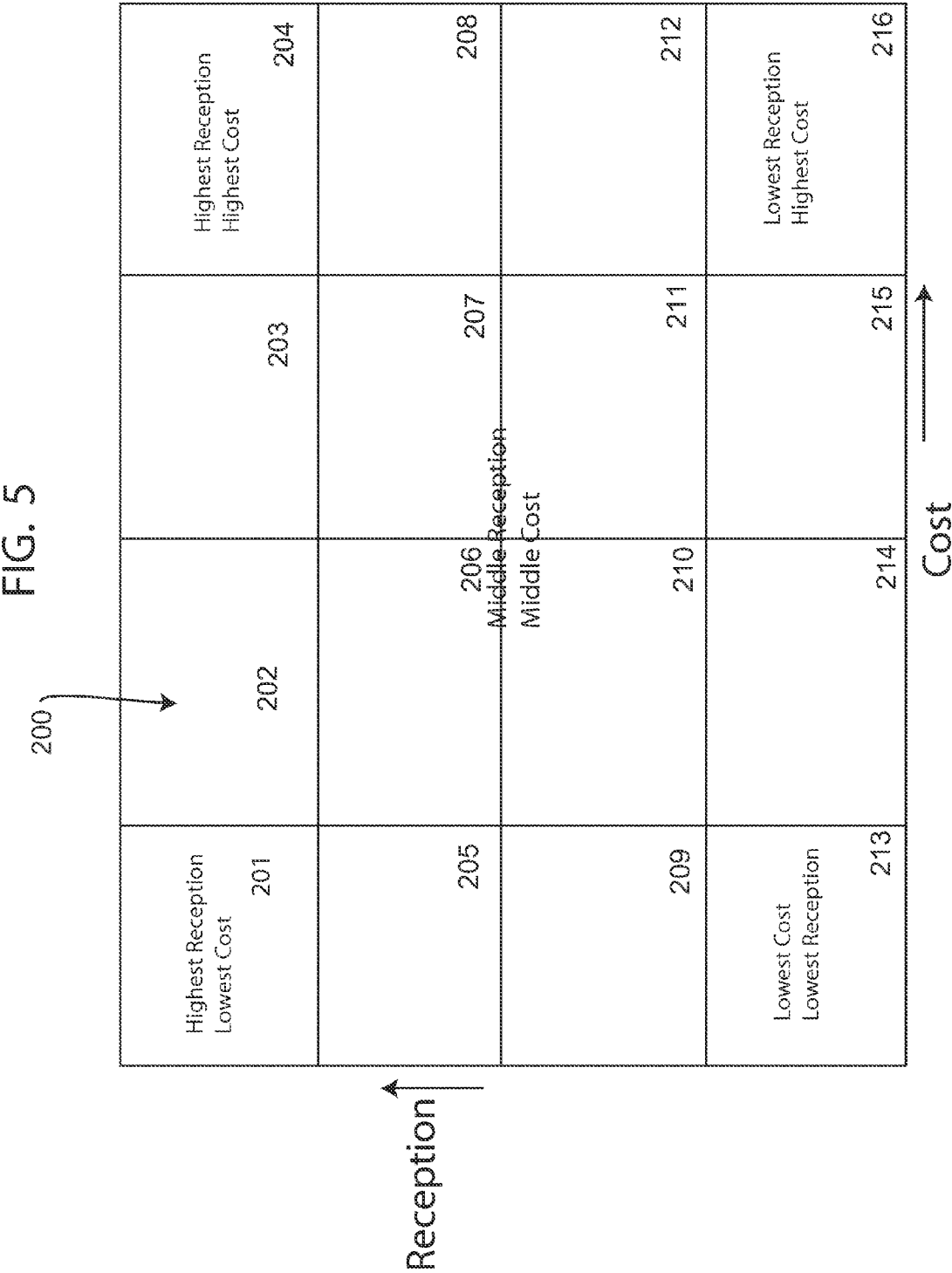

SYSTEM AND PROCESS FOR SWITCHING BETWEEN CELL PHONE AND LANDLINE SERVICES

CROSS REFERENCE TO RELATED APPLICATIONS

This application is a non provisional application and hereby claims priority from U.S. Provisional Patent Application Ser. No. 60/676,632 filed on Apr. 29, 2005, the disclosure of which is hereby incorporated herein by reference.

BACKGROUND

The invention relates to a system and a process for determining the most advantageous telephone system to use to connect a call based upon the price of the call and the quality of the reception. The system can then be used to automatically switch the user between the different services or to allow a user to manually select the different services to use.

Other telephone systems are known in the art. For example: U.S. Pat. No. 5,638,433 to Bubian, Jr. et al.; U.S. Pat. No. 6,970,692 to Tysor; U.S. Pat. No. 6,813,264 to Vassilovski; U.S. Pat. No. 6,804,532 to Moon et al.; U.S. Pat. No. 6,836,644 to Bacon et al.; U.S. Patent Application Publication No. 2005/0153736 to Ganton; US Patent Application Publication No. 2005/0107086 to Tell et al.; U.S. Patent Application Publication No. 2004/0242230 to Rue; U.S. Pat. No. 6,804,536 to Bultman; U.S. Pat. No. 2004/0235518 to Beyette et al.; US Patent Application Publication No. 2004/0204033 to Yang; U.S. Pat. No. 6,539,237 to Sayers et al.; U.S. Pat. No. 6,498,938 to Morrow, Sr.; U.S. Pat. No. 6,741,835 to Pulver; US Patent Application Publication No. 2004/0259541 to Hicks et al. III; U.S. Pat. No. 6,240,169 to Haskins et al.; U.S. Pat. No. 6,078,652 to Barak; U.S. Pat. No. 7,003,281 to Gamble; U.S. Pat. No. 6,487,283 to Thomas et al.; U.S. Pat. No. 5,138,650 to Stahl et al.; U.S. Pat. No. 6,424,760 Katz et al.; U.S. Pat. No. 6,751,462 to Torrey et al.; U.S. Pat. No. 6,473,499 to Ng; US Patent Application Publication No. 2004/0266478 to King et al.; and U.S. Publication No. 2006/0068795 to Caspi et al., the disclosures of which are hereby incorporated herein by reference.

SUMMARY

In this case it could be advantageous to a user if a docking station could decide whether it should route the current call through a cell phone or through a land line service such as a POTS service or a voice over IP or VOIP service. Under many circumstances it may be more advantageous to route calls through either a cell phone, or a VOIP service, however, charges associated with a cell phone service can vary depending on different characteristics associated with the call.

For example, if the call is a local call, such as within the same area code, many land line plans allow free local calls within the United States. Thus, in this instance, using a cell phone instead of a landline would mean that the user would lose precious minutes on his or her cell phone plan that could have easily been saved if the user had not chosen to use the cell phone plan.

In addition, international calls or calls using specific numbers such as 1-800 numbers are typically less expensive when using a land line. This is because third party providers often offer plans to save on international, long distance and even frequently called numbers.

Furthermore, depending on the cell phone plan, if a user exceeds his or her minutes, the penalties could be particularly harsh. For example, a user may have 600 free minutes in a month for $39.99, however if the user exceeds this time limit, then the user could be charged up to 40 cents a minute.

Therefore, the present invention is not limited to a simple docking station for a cell phone but rather an intelligent system that can include a docking station that can be used to optimize the cost relating to a user's phone bills.

The invention can relate to a system for determining which type of telephone communication service to use. The system can include at least one base station, and at least one telephone communication system or mechanism in communication with the base station. There can also be at least one computer which is in communication with at least one the base station or the telephone communication system or mechanism. There can also be at least one database system in communication with the computer. The database system can be for storing data, which can be used for assisting the computer in selecting a particular telecommunication service to place a telephone call based upon a user's preferences.

In addition, there can also be a communication network, wherein the computer can be in the form of a server which is in communication with the base station over the communication network. In this case, the database can be disposed on the server.

Alternatively the computer for performing the functions for this system can be stored in a telephone handset or in a base station for receiving a telephone handset or functioning as a telephone.

The database can include a plurality of listings of characteristics including the price of a call and the quality of a reception of a call based upon historical data.

To determine the characteristics surrounding a telephone call, the computer can determine a level of quality of call reception during an initialization of a call. In addition, the database can be used to store information about a caller's plan including the number of minutes left in the user's plan.

In this case, the database can be used to store information about a caller's plan including the different rates based upon the time of day of the call. In addition, this database can be used to store information relating to a number prefix for a discount calling plan for a user's call. Furthermore, this database can be used to store information relating to a number prefix for the region that the user is calling. This database can also be used to store information relating to whether a call is local, toll free, or an international call. All of these characteristics can be compiled in a database matrix table which would allow the computer or the user to quickly select the desired type of calling plan.

Once these characteristics have been compiled, the computer can be used to determine the cost of a call based upon at least one of the following characteristics: the number of minutes left in a user's plan; the time of day or the day of the week; the party being called; the number prefix for determining whether the user is calling under a discount calling plan; the number prefix for determining whether the call is a local, toll free, or international; the information relating to the carrier of the number to be dialed, and a listing of the historical records for the connection quality for a telephone call based upon the region that the user is calling from.

Essentially, the computer or computers can process this information in the database and make the determination based upon a series of steps that can be in any practical order. For example, the first step can include determining which phone services are available, for example, the computer may be able to select from a plurality of different plans for each user including at least one cell phone plan, at least one land line plan or at least one voice over IP plan (VOIP).

Next, if the pricing of the plan is based upon the number of minutes in the plan, the computer can determine for at least one phone service, the number of minutes left in that plan.

Next, the computer can determine the time and day of the week or the day of the month for a particular call. For example, some cell phone plans have free unlimited calling during nights and weekends. This type of pricing plan would be included as part of the pricing schedule. In addition if a user was calling during the end of the time period such as the end of the month and there were still a substantial number of minutes left in that user's plan, then the computer could select the appropriate plan for that user which would most likely be the user's cell phone plan.

Next, the computer could determine whether the number to be dialed is part of a similar network or service provider as the service where the call is originating from. In addition the computer could be used to determine whether the call is either local, toll free, or international. In many cases, the calls associated with a land line or POTS connection are free if the call is designated as a local or toll free call such as relating to a (800) prefix number. In addition, it is currently recognized that international calls are less expensive when originating from a land line call rather than via a cellular calling plan. All of these factors would be weighed to determine the pricing of the call.

Next, the computer could determine the signal strength for the call. This would be particularly important for wireless telephone plans which can include cellular telephones and satellite telephones. If the reception quality is not sufficiently strong, then it may be more beneficial for a user to individually select or to have a computer select a calling plan that may cost the user more but offer better service.

Based upon these criteria, the computer can select based upon an algorithm which can use a formula or a database matrix table for selecting the best combination of price and quality of reception based upon a default set of criteria, or based upon a user's pre-set selection criteria. Next, the computer could connect a telephone call to a desired telephone destination.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views:

FIG. 3A shows a block diagram for a first embodiment of a base station;

FIG. 3B shows a perspective view of the base station shown in FIG. 3A;

FIG. 3C shows a block diagram for a second embodiment of a base station;

FIG. 3D shows a perspective view of the base station shown in FIG. 3C;

FIG. 3E shows another embodiment of a base station;

FIG. 5 is a view of the matrix for determining the system for selecting the carrier plan;

DETAILED DESCRIPTION

Figure 1A:
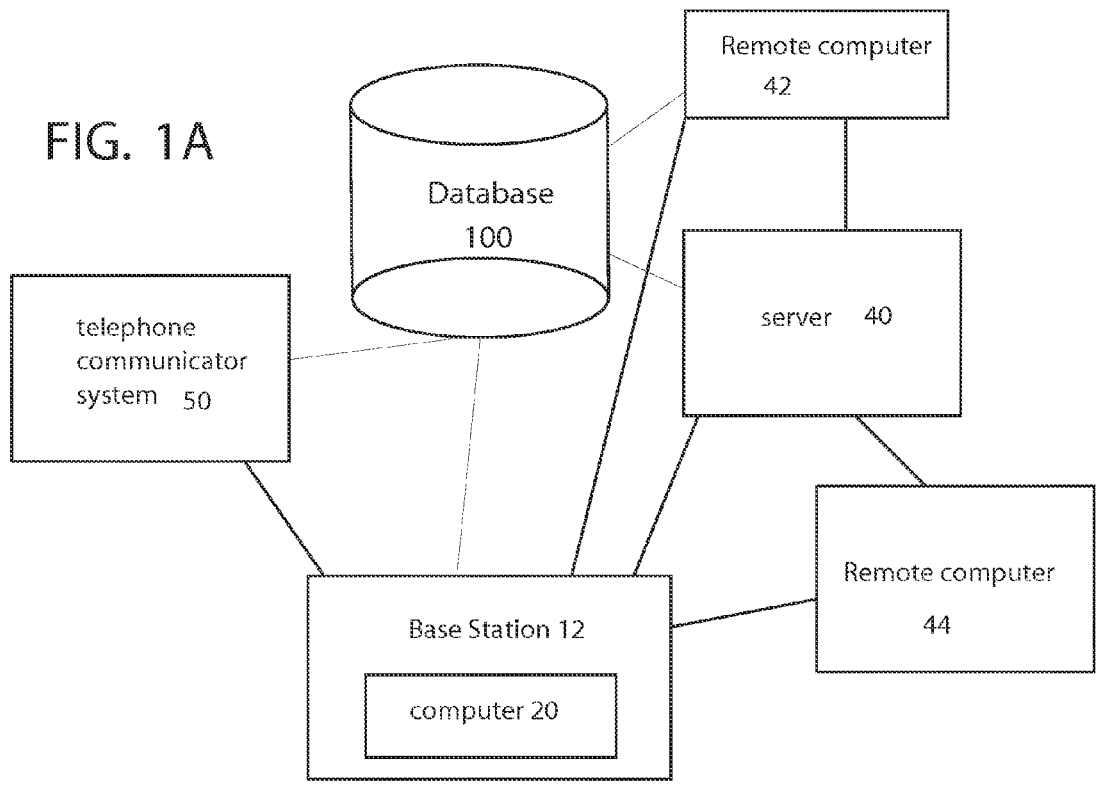
FIG. 1A is a block diagram showing multiple potential embodiments of a layout of the system.
Figure 1B:
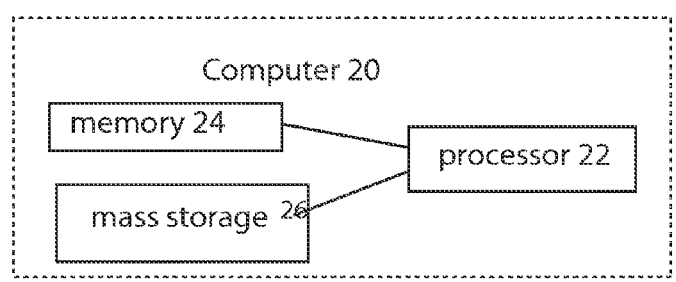
FIG. 1B is a block diagram of a layout of the computer.

Referring in detail to the drawings, FIG. 1A is a block diagram of a first embodiment of the system. With this design, there is a base station 12 which can include a computer 20 which is shown in greater detail in FIG. 1B. For example, computer can be in the form of any type of computer such as a personal computer (PC) or a server or it can be in the form of a set of processing and memory components including a RAM memory 24, a ROM or flash memory or mass storage 26 and a processor 22.

Base station 12 can be in communication with server 40, and telecommunications system 50. Remote computers 42 and 44 can be in communication with server 40 and/or with base station 12. This communication can be through a direct connection to base station or through an internet or ethernet connection with base station through another computer. Database 100 can be stored on base station 12, computer 20, server 40, or telecommunications system 50 or remote computers 42 or 44.

Figure 2:
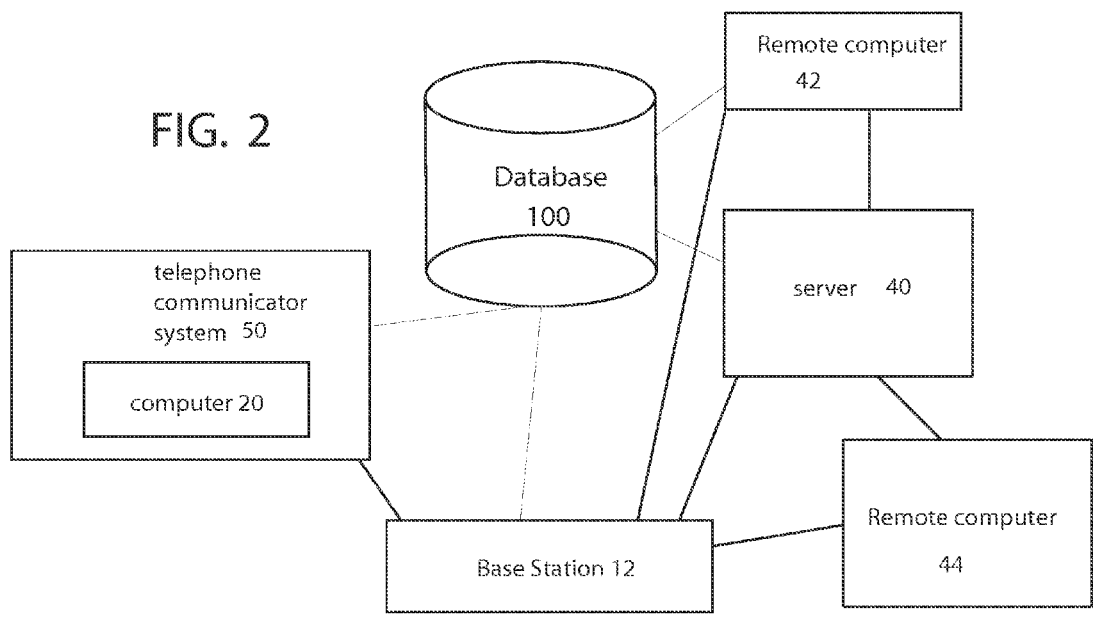
FIG. 2 shows another embodiment of a system for housing a computer.

FIG. 2 shows a block diagram of an alternative system which includes a telephone communication system 50 which can housed in a computer 20. Telephone communication system can be in the form of a cordless telephone which can house a computer type device 20 inside. With this design, the program or process followed by the system can be processed inside of computer 20 which is disposed inside of the associated handset. With this design, database 100 can be either store on handset or communicator system 50, or in base station 12, or on server 40 wherein if this database is stored in server 40 it can also be uploaded to telephone communicator system or handset 50 or to base station 12. Remote computers 40 and 42 can also be used to input information into the system, particularly into database 100 to update information relating to database 100 including information regarding particular calling plans, pricing, historical reception quality or any other characteristic processed by database 100.

FIG. 3A shows a schematic block diagram of a base station 12 wherein this base station is shown in a perspective view in FIG. 3B. With this design, this base station 12 can include a communications interface 80, which can be in the form of a keypad, a speakerphone, or loudspeaker, an LED or LCD display and any other interactive features necessary for achieving a call. In addition, this device can also include an antenna 60, for wireless communication, an RJ11 connection 62 or a TCPIP or ethernet communications connection 64.

For example, antenna 60 can be for any known wireless communication including but not limited to 900 mHz communications, 80211 a, b or g communications bluetooth communications, satellite communications, or any other known wireless type of communications.

RJ11 connection 62 can be used to allow this base station 12 to connect to a typical telephone line, while ethernet connection 64 can be used to allow this base station to connect to a computer or other computerized network. These different types of connections are all optional so long as there is at least one type of communication with the base station. For example, the base station may only include a wireless antenna 60 which could allow the system to compare the pricing on at least two wireless plans, or to compare the pricing between a wireless plan and a wired plan that communicates through antenna 60 such as a typical phone plan or a VOIP type plan. Alternatively there could be multiple RJ11 connections or multiple ethernet connections, or any permutation of multiple different communications means including multiple wireless communications means through multiple SIM cards 70, multiple RJ11 connections, or multiple TCPIP connections. There is also a power source 121 which can be in the form of a battery or a power input to power this system. All of these components can communicate with each other through either one common mother board or multiple motherboards in any known manner.

Connected to this base station 12 is also a handset 90 which allows a user to communicate using this handset which can be in wired communication with this base station 12.

Figure 4A:
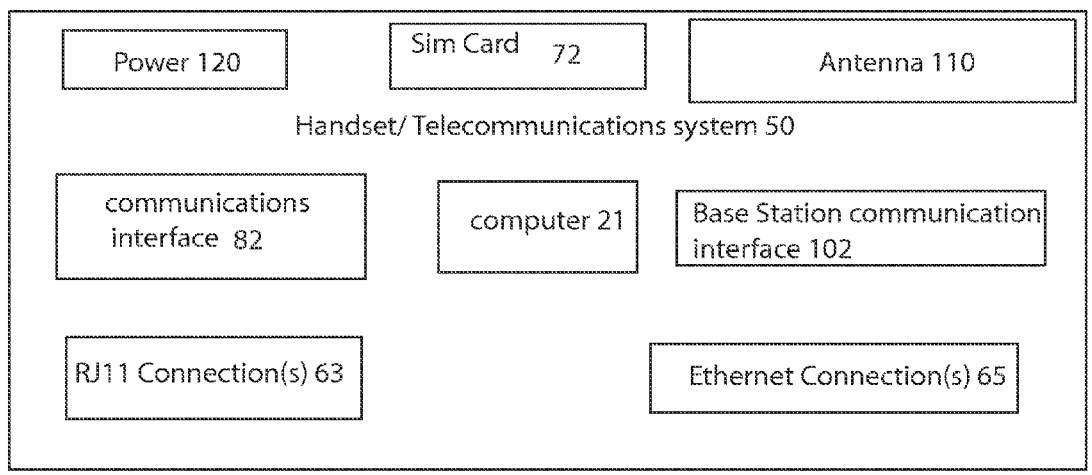
FIG. 4 shows a block diagram for a handset.
Figure 4B:
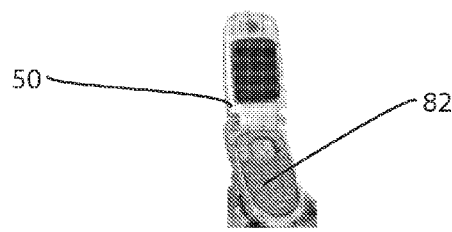

FIG. 3C shows a block diagram for a similar type base station 12a, however this type base station does not include an antenna or a SIM card as disclosed in FIG. 3A, because this antenna and SIM card is disposed inside of handset or telecommunications system 50 as shown in FIG. 4A. With this base station, there can be a handset 90 coupled to the base station, while there is also an additional handset communication interface 100, which can be used to allow a handset/telecommunications system 50 to communicate with handset 12a. Handset communication interface 100 includes communication connections for establishing a communication contact with handset 50, and also for establishing a power connection with handset 50 to recharge a battery or power module 120 (See FIG. 4A).

With this device, there can be an optional communications interface 80 which would allow a user to dial a number or to communicate via a speakerphone without touching handset 50.

FIG. 3E shows a perspective view of a similar type handset which can include a handset communication interface 100, and may optionally include a computer 20 for running the process according to the system. However, this type of design can also be built as a simple basic handset for recharging a handset or for further communication via RJ11 communication interface 62 or ethernet communication interface 64 while the process runs on a computer or computer type system on handset 50.

FIG. 4A is a block diagram of a set of components for a handset 50. In this case, there can be an optional computer 21 which can be used to run the process according to the system. Since this process can be performed via either another computer, or via one of the above handsets 12, or 12a, a handset for use with those systems may not include computer 21.

Handset 50 can also include at least one SIM card 72, however this handset can also include multiple additional SIM cards as well. In addition, this handset 50 can also include a communications interface 82 which can include a keypad, a speakerphone, a microphone, a display, or any other means for communicating via a handset that is known in the art. There can also be a base station communication interface 102, which can be used to communicate with handset communications interface 100. This form of communication can be in the form of a power connection, and a data connection so that power can be received by handset 50 from the base station, while data can be both uploaded and downloaded between handset 50 and its associated base station.

In at least one other embodiment of handset 50 can also include at least one optional RJ11 connection(s) 62—and/or at least one optional Ethernet connection(s) 64. Communications between many of these components housed inside of handset 50 can be through a motherboard of any known design which can be used to connect these components together inside of a common handset housing.

FIG. 5 shows a matrix which can be used to help a user or the system to determine which telecommunications system or plan to use before transmitting a call. For example, this matrix 200 can be stored with database 100 and can be set forth as a composite or array of price vs. quality of reception. In this case, either a computer 20, a handset 50 or a base station can determine the signal strength of a reception connection either through actual or historical calling data. In this case, the actual data could be the particular reading that is registered as a reception signal either through the handset or through the base station. In most cases, this reading is shown visually on a display through "bars" wherein with most cell phones, 0 bars means little or no reception and the greatest number of bars such as 5 bars means the highest reception quality.

Alternatively, the reception quality of the call can be based entirely on the historical data, of the reception signal rather than on the actual signal received by either the handset or the base station. For example, this information can be read from the antenna 60 or 62 and then stored in database during a previous call. For example, if calls are consistently made from a particular stationary base station, and the call reception is consistent because this base station does not move, then the system can use this historical information recorded in database 100 to calculate the proper calling system using matrix 200.

In addition to the signal quality, the cost of a particular call can be determined. This cost can be determined by querying the different parameters for different calling plans and then determining which plan would be most likely to invoke the least cost on the present call and on calls in the recent future.

For example, some of the parameters for determining the cost of a call can include at least one of the following parameters: determining the minutes left in a users calling plan; determine the time, day of the week and day of the month; determine whether the receiving caller is part of the same network, determine whether a call is local, toll free, or international, determine whether the call is an emergency call such as a 911 call, or any other parameter which may affect a users access or the cost of a users call. Thus, depending on the time of the month, and the number of minutes left, the weighted cost of a call may be different. For example, the weighted cost of a call on a plan having 600 minutes left in a month and only one hour left in the month might be much lower than a weighted cost of a call having only 30 minutes left and 28 days left in the monthly or periodic calling plan cycle.

This simultaneous or effectively simultaneous cost vs. reception comparison can be used to provide for a particular user the best quality call at the lowest price. Matrix 200 shows that in many cases calls using a plan which result in the position of 201 in matrix 200 would most likely be the most advantageous type of call. This is because this type of call would be a call with the highest reception quality and the lowest cost. Conversely calls through a system which would be found in box 216 in matrix 200 would result in the least advantageous call because this would result in the lowest reception quality with the highest cost.

The system or program running on computer 20 can provide default settings for weighted criteria for reception quality and for the cost of the call. In this way, each prospective call can be charted on a matrix such as that shown in matrix 200. In addition, a user could adjust these default settings to alter the positioning of different options on this matrix. For example, each user could adjust the weighted settings for cost or reception quality. Thus, a user may value reception quality higher than the associated cost. Alternatively, the user may be able to adjust these values or correlate these values by placing an approximate price tag on reception quality. Therefore, each "bar" in reception quality may be balanced against a prospective call cost such as for each bar of increased reception quality, would amount to an associated $1.00 in call cost.

Before placing the call, the system could also calculate the duration of the call, based upon previous calling data to the same number. For example, if a user was calling his or her parents, at a particular number, and the duration of that call was on average 1 minute, then the total cost of an estimated call could be calculated vs. reception quality. Alternatively, if a user was calling a new partner, or significant other and the average call length was much longer, then the system could calculate a different level of cost vs. reception quality by placing a higher weight on the expected cost of the call vs. reception quality.

Figure 6:
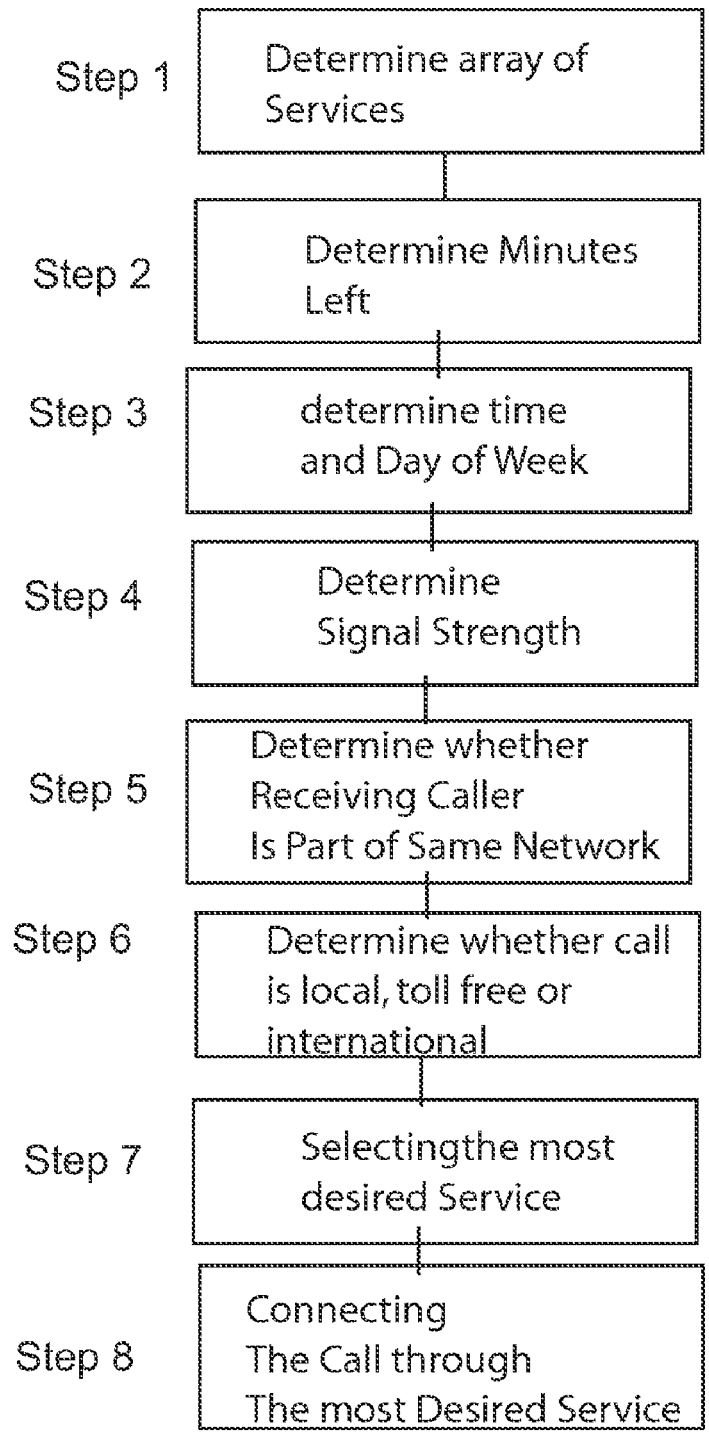
FIG. 6 is a flow chart for a first process for the system.

FIG. 6 shows an example of a flow chart for the process which can be conducted by a program performed on computer 20. This program can be performed on a computer 20 which can be housed on any known personal computer or server 40, 42, or 44, in a base station 12, 12a, or 12b or in handset 50.

This process can be in any known practical order wherein the order shown in FIG. 6 is shown by way of example. For example, step 1 can include the step of determining the array of services provided for an individual user. For example, a user can subscribe to multiple calling plans including multiple cell phone plans, multiple satellite phone plans, multiple line or POTS based plans, and multiple VOIP plans. All plans available to a particular user at that particular calling time are then polled and identified in this step. This step can be optional but can be important because if a handset is not in communication with a base station, it may not have access to different calling plans such as a VOIP plan that is in communication with a base station. Therefore, the system may then only have access to wireless type plans.

Next, in step 2, the process can optionally include determining the minutes left in a plan. This step can be optional but possibly important because many cellular telephone plans can include different pricing plans depending on the minutes left in a user's plan. Next, in step 3, the system can optionally include a step of determining the time and day of the week. Some calling plans offer rate plans that include "free nights and weekends" or other types of plans. In that case, these parameters could be important for pricing a telephone call.

Next, in step 4, the system could optionally determine the signal strength of the handset or in the base station. As described above, this determination could be based upon the actual data received on the reception strength by an antenna. Alternatively this reception quality could be based upon historical data of previous phone calls. This historical data could be stored in database 100.

Next, in step 5, the process and system could optionally determine whether the receiving caller is part of a same calling network. Some calling plans offer free calls or discounted calls if the call is with the same network. Next, in step 6, the system, process or program could determine whether the call is local, toll free, or international. For example, local calls, and toll free calls may be free on a land line system. In addition, long distance calls could be less expensive depending on the carrier or calling system used.

Step 7 results in either the system selecting the most desirable call service or the user having the selection of his or her most desired service. In this case, the user could be shown a matrix such as matrix 200 which would be presented on a screen either on base station 12, handset 50, or on a screen associated with server 40 or remote computes 42 or 44, could show the position of each calling service positioned in different positions in matrix 200. The user could then select a particular plan based upon a position on this matrix. For example, this selection could be made by assigning a number to each calling plan and then allowing a user to press an associated number on the keypad associated with either base station 12, or 12a or on a keypad on handset 50 to choose the desired calling plan or on a keyboard, in connection with computers 40, 42, or 44, base station 12, 12a, or 12b, or with hand set 50. This selection could also be performed on a computer using a computer keyboard which could be used to select a particular plan. Next in step 8 the system could place the call through the most desired service.

Figure 7:
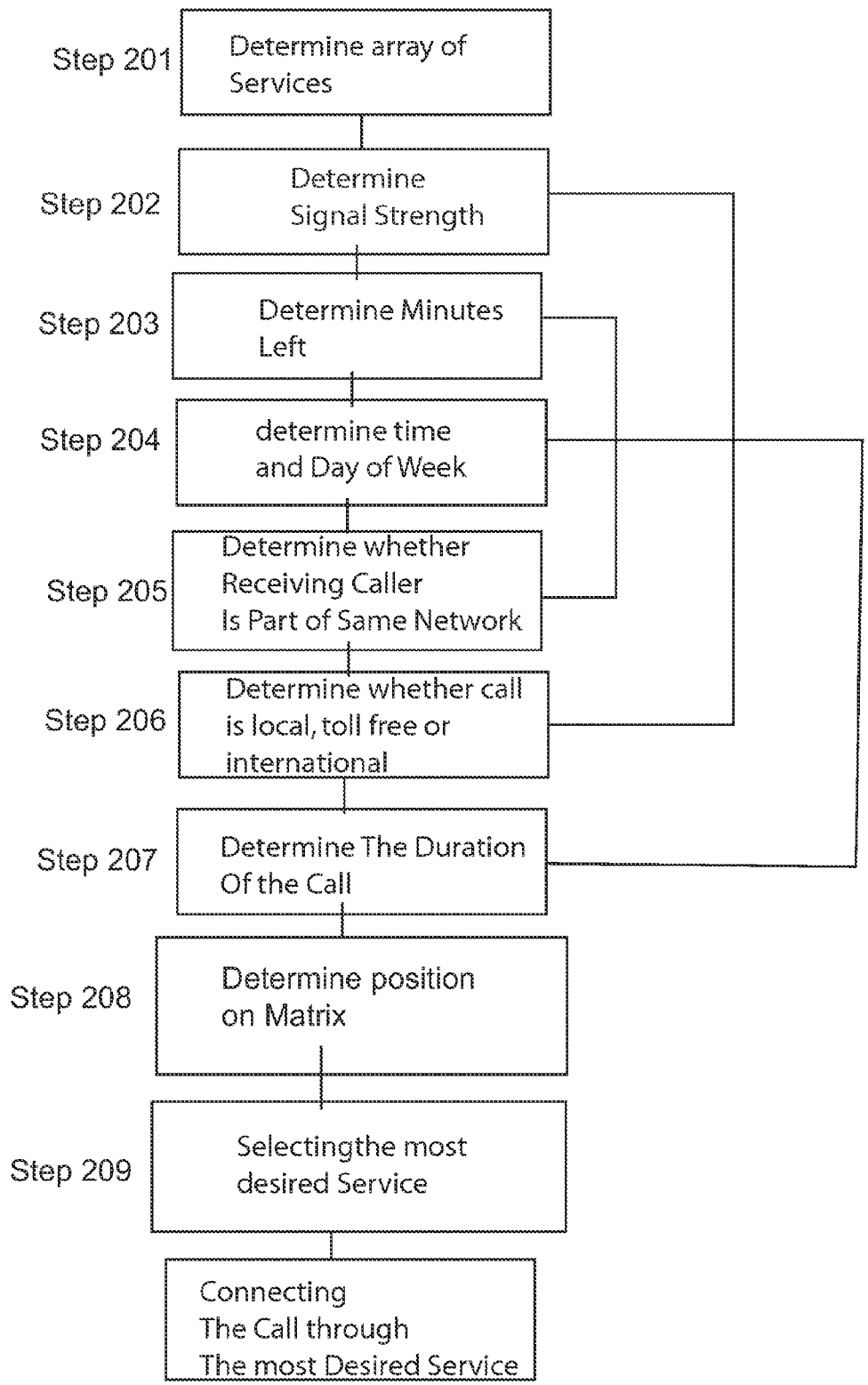
FIG. 7 is a another flow chart for conducting an alternative process for the system.

FIG. 7 discloses an alternative process which can include steps 201-210, wherein steps 201-207 could be performed in any order. For example, step 201 could include determining the different services in the array of services. Step 202 can include determining the signal strength for each of these services. Next, step 203 can include determining the number of minutes left in each plan or in any one of the particular plans. Next, step 204 involves determining the time of day and the day of the week. Next, step 205 can include determining whether the receiving caller is part of the same network. Next, step 206 can include determining whether the call is local, toll free, or international. Next, in step 207 the system can include determining the historical call duration to a particular caller based upon previous call data. This step could be used to estimate the total cost for a particular call. Next, in step 208, the system can be used to determine the position of each calling plan on matrix 200. Next, in step 209, either the user or the system could select the most desirable service while in step 210, the system can connect the call through the most desired service.

Ultimately this system could be set so that the least cost/ and highest quality service is either automatically selected each time or manually selected by each user or a combination of both. In addition, this type of system also allows each user to adjust his or her weighted preferences for cost and quality of reception based upon individual tastes. For example, a user could log into a handset 50 a abase station 12 or a remote computer 42 or 44 or server 40 and access database 100. Once the user has access to this database, the user can use a keypad associated with handset 50 or base station 12 or a keyboard associated with either server 40, remote computer 42 or remote computer 44 and reset particular weighted values for signal strength or price. In addition, each user could have multiple customizable presets for different calling numbers. For example, if a user was calling an emergency number such as 911, the preset could always be set for the highest quality call over price.

Ultimately, this system could be used to give each user the most variety in calling plans for any particular call.

Accordingly, while at least one embodiment of the present invention has been shown and described, it is to be understood that many changes and modifications may be made thereunto without departing from the spirit and scope of the invention as defined in the appended claims.

What is claimed is:

1. A computerized method for determining which telephone service to use for a particular call selected from a plurality of phone services comprising using a processor which is programmed to perform the following steps:
   providing a portable base station for housing the processor;
   determining via the processor which of the phone services are available wherein the phone services are selected from the group comprising landline phone services, and wireless phone services;
   determining via said portable base station a call quality for each phone service;

determining via the processor for at least one phone service the number of minutes left in a plan for that service;

determining via the processor the time and day of the week for a particular call;

determining via the processor the signal strength for the call;

determining via the processor whether the number to be dialed is part of a similar network or service provider as the service where the call is originating from;

determining via the processor whether the call is either local, toll free, or international; and selecting a particular carrier in a said base station based upon both call an estimated call quality and an estimated price of the call;

automatically connecting a telephone call in said base station through the particular carrier and particular service selected from the group comprising landline phone services, and wireless phone services based upon the determined answers from all of said determination steps to provide a caller with a call having the desired characteristics of price and quality of the call.

2. The method as in claim 1, wherein a system for connecting a telephone call selects a cell phone plan if the number being dialed is part of a similar or the same telephone network.

3. The method as in claim 1, wherein a system for connecting a telephone call selects a particular telephone service based upon the number of free minutes left in a telephone service plan.

4. The method as in claim 1, wherein said landline phone service comprises both analog phone service and voip phone service.

5. The method as in claim 1, wherein said step of connecting a telephone call through the desired service occurs in said base station wherein said base station comprises a RJ11 connection, a ethernet connection and at least one wireless communication means through a SIM card.

6. The method as in claim 1, further comprising the step of selecting a desired phone service based upon an estimated cost for the call.

7. The method as in claim 1, further comprising the step of selecting a desired phone service based upon a perceived quality of reception of the call.

8. The method as in claim 1 further comprising the step of determining the service to select based upon the number dialed by the customer.

9. The method as in claim 1, wherein said step of selecting a desired phone service comprises selecting a phone service based upon a balance between potential cost for the call and perceived reception quality of the call based upon a matrix of pre calculated values and which is stored in said base station.

10. The method as in claim 9 wherein said matrix is displayed on a screen on said base station.

11. The method as in claim 1, wherein said matrix is stored in a handset on said base station.

12. The method as in claim 11, wherein said matrix is programmable.

13. The method as in claim 12, further comprising the step of adjusting a position on said matrix for determining which of said services to use.

14. The method as in claim 13, further comprising the step of using at least one keypad to adjust a position on said matrix for determining which of said services to use.

15. The method as in claim 14, further comprising the step of presetting a position on a matrix for a particular call based upon a particular number.

16. A method for determining which telephone service to use for a particular call comprising the following steps:

providing a portable base station;

determining in said portable base station a reception quality of a call to be placed;

determining via said base station which phone services are available wherein said phone services are selected from the group comprising: landline analog phone services, and voice over IP phone services;

determining for at least one phone service the number of minutes left in a plan for that service;

determining the time and day of the week for a particular call;

determining the signal strength for the call;

determining whether the number to be dialed is part of a similar network or service provider as the service where the call is originating from;

determining whether the call is either local, toll free, or international;

selecting a desired phone service in said base station; and automatically connecting a telephone call through a base station to a desired carrier and to the desired service selected from the group comprising landline phone services, and wireless phone services based upon the determined answers from all of said determination steps, wherein said connection occurs in a base station for a phone to provide a caller with a call having the desired characteristics of price and quality of the call.

17. The method as in claim 16, further comprising the step of determining the service to select based upon the number dialed by the customer.

18. The method as in claim 16, wherein said step of selecting the desired phone service comprises determining based upon availability, reception quality and cost the proper phone service for selection via a matrix.

19. The method as in claim 18, wherein said step of selecting a desired phone service includes utilizing a stored matrix of values for both reception and cost for an available service.

20. The method as in claim 16, further comprising the step of:

recording in said portable base station historical reception quality information based upon previous calls from said portable base station.

21. The method as in claim 20, further comprising the step of displaying said matrix on a screen on said portable base station.

* * * * *